(12) United States Patent
Gupta et al.

(10) Patent No.: US 8,750,901 B1
(45) Date of Patent: Jun. 10, 2014

(54) LOCATION AWARE REQUESTS

(75) Inventors: Diwakar Gupta, Seattle, WA (US); Paul C. Schattauer, Seattle, WA (US); Chih-Jen Huang, Kirkland, WA (US); Kiran Kumar Meduri, Bellevue, WA (US)

(73) Assignee: Amazon Technologies, Inc., Reno, NV (US)

( * ) Notice: Subject to any disclaimer, the term of this patent is extended or adjusted under 35 U.S.C. 154(b) by 1244 days.

(21) Appl. No.: 12/146,761

(22) Filed: Jun. 26, 2008

(51) Int. Cl.
*H04W 24/00* (2009.01)
*G06Q 40/00* (2012.01)
*G06Q 20/00* (2012.01)

(52) U.S. Cl.
USPC ......... 455/456.3; 455/456.1; 705/44; 705/39; 705/78

(58) Field of Classification Search
CPC .................. H04W 4/023; H04W 4/028; H04L 29/08657; H04L 29/08108; H04L 29/08936; G06Q 20/3224
USPC .......... 455/456.1, 466, 456.3; 705/39, 78, 44; 707/9
See application file for complete search history.

(56) References Cited

U.S. PATENT DOCUMENTS

| | | | |
|---|---|---|---|
| 7,936,736 B2 * | 5/2011 | Proctor et al. | 370/338 |
| 2004/0107144 A1 | 6/2004 | Short | |
| 2006/0085419 A1 * | 4/2006 | Rosen | 707/9 |
| 2007/0055672 A1 * | 3/2007 | Stevens | 707/10 |
| 2007/0084913 A1 * | 4/2007 | Weston | 235/380 |
| 2007/0233615 A1 * | 10/2007 | Tumminaro | 705/75 |
| 2007/0270159 A1 * | 11/2007 | Lohtia et al. | 455/456.1 |
| 2010/0174647 A1 * | 7/2010 | Kowalchyk et al. | 705/44 |

OTHER PUBLICATIONS

Non-Final Office Action for U.S. Appl. No. 12/146,768, mailed on Jun. 30, 2011, Diwakar Gupta, "Location Aware Transaction Authorization", 11 pages.
Non-Final Office Action for U.S. Appl. No. 12/146,768, mailed on Dec. 29, 2011, Diwakar Gupta et al., "Location Aware Transaction Authorization", 12 pages.
US Patent Application, filed on Jun. 26, 2008, Diwakar Gupta et al., "Location Aware Transaction Authorization."

* cited by examiner

*Primary Examiner* — Opiribo Georgewill
(74) *Attorney, Agent, or Firm* — Lee & Hayes, PLLC

(57) ABSTRACT

A mobile payment network receives a payment request from a first user operating a first mobile device and identifies recipients of the payment request based at least in part on the proximity of other mobile devices to the first mobile device.

28 Claims, 4 Drawing Sheets

LOCATION AWARE REQUESTS

BACKGROUND

Commerce depends on a vast number of financial transactions that distribute funds among participants such as merchants, customers, companies, and other entities. Traditional methods of conducting financial transactions commonly consist of an exchange of currency, which may include paper currency, checks, credit cards, and electronic transfers. With each type of currency, a number of processes are typically invoked to fulfill a transaction. The processes may include a payment fulfillment process, paperwork, and processes performed by a banking institution, among other possible processes.

In more recent years, financial transactions have moved online onto the Internet. It is commonplace for entities to transfer payments across the Internet to complete a transaction. Furthermore, devices used to initiate these types of online payments increasingly include wireless mobile devices such cell phones, personal digital assistants (PDAs), text messaging devices, and other devices that communicate in conjunction with the Internet or other communication networks. The ability to initiate transactions from virtually anywhere introduces new security risks, such as receipt of payment by an unintended recipient and/or transmission by someone other than an account owner.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

This disclosure is directed to techniques and systems for securing or authorizing transactions implemented through personal mobile devices such as cell phones, PDAs, personal computers, and other such devices. The described techniques and systems allow users to perform fund transfers, payments, or other types of transactions with other users via a mobile or wireless network using the communications capabilities of their mobile devices.

To safeguard against unauthorized or unintended transfers in this mobile environment, the described embodiments use the location awareness of modern devices to determine whether the parties of a requested transaction are physically near each other. Based on this information, a financial institution or transaction processor can take different types of security measures before fulfilling a request. For example, the transaction processor might simply disallow any transaction between parties that cannot be confirmed to be within a defined physical proximity of each other. Alternatively, the lack of physical proximity might trigger other security measures as prerequisites to the requested transaction.

The techniques described herein may be implemented in a number of ways. Specific examples are described below.

Illustrative System Architecture

Figure 1:
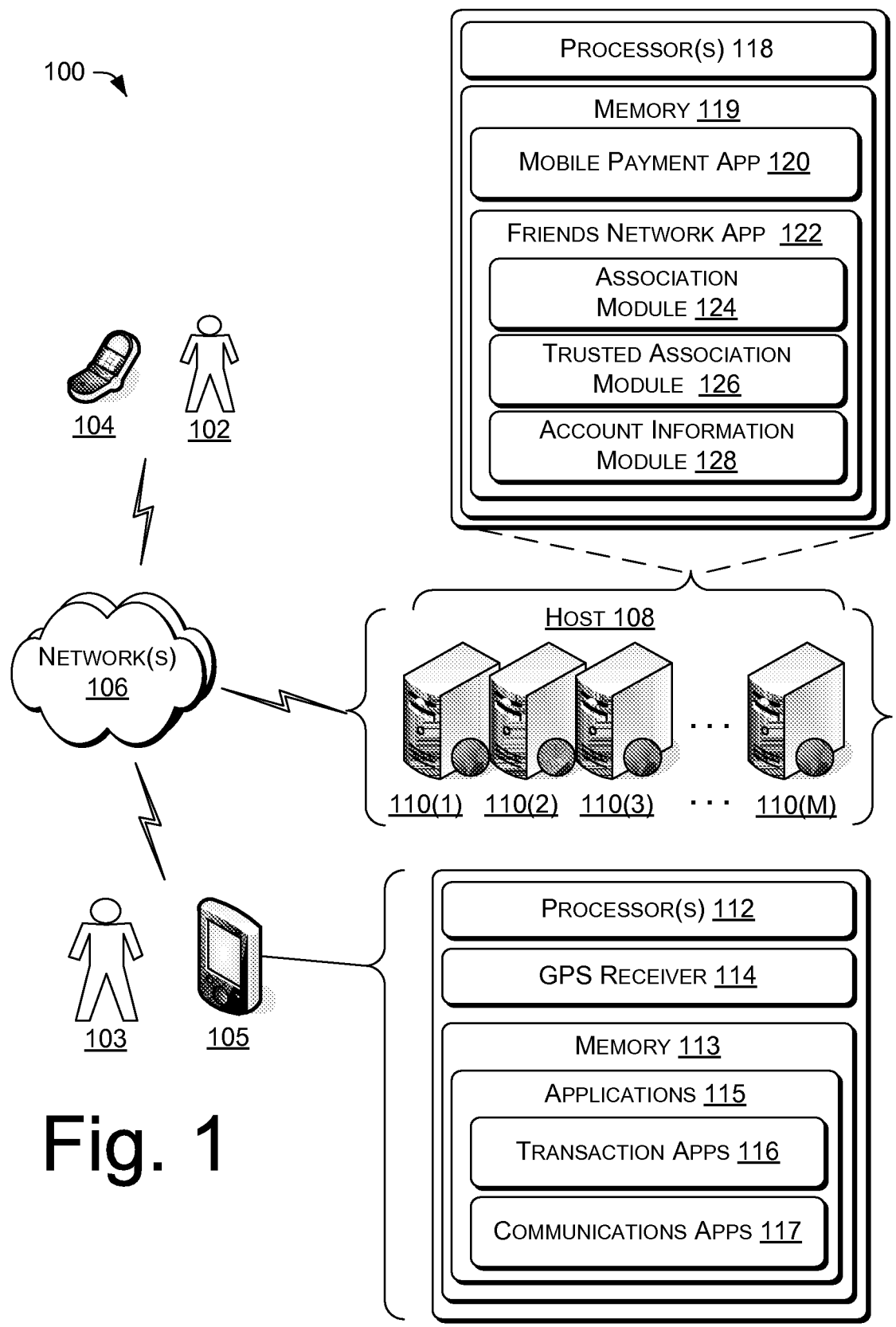
FIG. 1 illustrates an example architecture of a mobile payment network.

FIG. 1 illustrates an example architecture 100 for a mobile payments network. Different users or account holders 102 and 103 are associated respectively with their own mobile communications devices 104 and 105. Mobile devices 104 and 105 communicate through a network 106 with a host 108. In many implementations and transactions, devices 104 are personal wireless communications devices such as cell phones. Some types of mobile devices might also be used by or associated with merchants, to allow user/merchant payment transactions.

Illustrated network 106 is representative of many different types of networks, such as cable networks, the Internet, local area networks, mobile telephone networks, wide area networks and wireless networks, or combinations of such networks.

Although FIG. 1 shows only two users and two corresponding mobile devices, host 108 may communicate with a large number of users through their personal mobile devices. Furthermore, the overall system or network might include a number of different hosts, operating cooperatively or independently.

Host 108 may comprise one or more servers 110(1), . . . , 110(M), perhaps arranged as a server farm. Other server architectures may also be used to implement host 108. The host 108 is capable of handling requests from many users and serving, in response, various information and data to the users. The servers 110 are capable of facilitating interaction by the mobile devices 102 and 103 between user 102 or 103 and those users' financial institutions via the network 106 and other communications paths.

The mobile devices 102 and 103 may be implemented in a number of ways. In FIG. 1, the devices are illustrated as wireless phones, but might alternatively comprise portable digital assistants (PDAs) and/or portable computers, which are capable of wireless communications using cellular networks, wide-area networks (wifi), wireless network access points, and other communications technologies. Various other types of mobile devices are also capable of utilizing the described techniques: portable gaming devices, video/audio recording devices, electronic book readers, and other portable electronic or entertainment devices, including both personal devices and merchant-related devices.

In the described implementation, the mobile devices have some degree of location awareness: they are able either to report their own locations or to report information that can be used to deduce their locations.

Many cellular phones and other mobile devices are location aware, through the use of various different means and technologies. For example, many modern cellular phones have integral global positioning system (GPS) receivers, which enable them to determine and report their own location to within a very small radius. Other techniques can also be used with varying degrees of accuracy by a mobile device to determine its location. For example, network IP addresses used by networked mobile devices can sometimes be used to deduce general location information by comparison to pre-compiled databases of IP networks and their geographic usage. As another example, mobile devices are sometimes configured to determine their positions by identifying any wireless network access points or wifi "hotspots" that are nearby or to which they are connected, and referring to an online database listing such access points and their locations. When using a cellular network, geographic position can be roughly determined by identifying the particular cell tower or transceiver with which the mobile device is communicating. Triangulation from two or more such cell towers, based on signal strength, can improve the accuracy of this approach. Various other techniques are conceivable for determining absolute or relative position of a portable or mobile device.

Note that for purposes of the techniques described below, it is not necessary for the mobile device to determine or report its actual position. Rather, the mobile device might report other information, from which a server or host can deduce the location of the mobile device. For example, the mobile device might simply identify the nearest cell phone tower or wireless access point. This enables host 108 to reference a database indicating the location of the identified tower or access point, from which the location of the mobile device can be roughly determined.

Certain components of a mobile device (applicable to both mobile device 104 and mobile device 105) are shown in FIG. 1. For purposes of discussion and illustration, these components of a mobile device include one or more processors 112, memory 113, and an internal GPS receiver 114. In this case, location awareness is enabled by GPS receiver 114. However, given the discussion above, it is apparent that many other techniques and technologies might be alternatively used to provide location awareness to mobile devices. Such techniques might or might not need dedicated internal hardware. For example, cell tower triangulation may not need any additional hardware other than the hardware that is normally part of a cell phone. Furthermore, Bluetooth and other wireless technologies allow mobile devices to operate in conjunction with other nearby external devices, such as independent GPS receivers.

It should also be noted that successful implementation of the techniques described herein may not depend on the accuracy of the chosen method of location determination. Even very rough positional indications can be used to improve the security of mobile payment transactions. Thus, a determination that two devices are near each other or in proximity to each other does not necessarily imply any particular degree of accuracy in the determination. In certain implementations, a mobile payments system might require that users be within a few feet of each other. Other implementations may only ask that users be in the same zip code, city, or state, or within a common geographical area defined by, for example, the capabilities of the locating technologies being used. In some embodiments, the proximity requirements for the transactions may be variable depending on the parties involved, the amount of the transaction, the time of day of the transaction, or the time of the year of the transaction, among other possibilities.

The memory 113 of a mobile device stores various software applications 115 used to perform routine functions. In addition, mobile devices 104 and 105 can include one or more transaction applications 116 and one or more communications applications 117 that interact with the users of the mobile devices and with host 108 to request, facilitate, and accept financial transactions.

Thus, users can employ their mobile devices 104 and 105 to interact with their user accounts through the host 108. In one scenario, a mobile device sends a request to the servers 110. The request may be a uniform resource identifier (URI) request or other type of request. Upon receiving the request, the servers return a page (or other communication) to the requesting mobile device, which allows the user to interact with the data provided by the servers. For example, a returned page may include links that enable the mobile device to request information related to the user's account. In addition, or alternatively, the returned page may include links that enable the mobile device to engage in transactions with another user. The other user may have their own mobile device, as illustrated in conjunction with the second of the two users/devices in FIG. 1. Servers 110 allow the two users to communicate and interact with each other through their mobile devices, via the network 106. For example, the users 102 and 103 and applications 115 of the mobile devices may communicate with each other and with servers 110 using simple text commands via simple message service (SMS) text messages or otherwise.

The servers 110 are equipped with one or more processors 118 and memory 119. The memory 119 may include applications, modules, and/or data. The memory 119 may include a mobile payment application 120 that enables the users 102 and 103 to make payments, authorize payments, and interact with a transaction account, among other possible actions related to the user accounts. For example, a user 102 may wish to engage in a payment transaction with the other user 103. The mobile payment application 120 can be configured to enable either user to transmit a payment, make a payment request, receive a payment, and/or conduct other transactions with any other user. As discussed herein, a payment or funds transfer may include a transfer of money, currency, credits, points, shares, or any other medium that may be transacted.

The mobile payment application 120 may also be used to verify and approve/deny user account actions initiated by any particular user. For example, user 102 may initiate a transaction request to transfer a payment from the user's own account to the other user's 103 account. The mobile payment application 120 may verify aspects of the requested payment transfer to ensure that the payment was intended, is permissible, and includes the correct recipient, among other possible factors to verify.

In particular, host 106 may require the mobile devices involved in a transaction to report location information prior to fulfilling a payment request, and to allow the requested payment only if the mobile devices have a specified physical relationship between each other. More particularly, a particular request might be declined unless the mobile devices being used in the transaction are confirmed to be within some physical proximity of each other. This reduces the chances of fraudulent transactions by ensuring that user-to-user transactions can only be made between users who are in the same vicinity, and who are therefore more likely to be intentionally requesting the transactions.

Illustrative Operation

Figure 2:
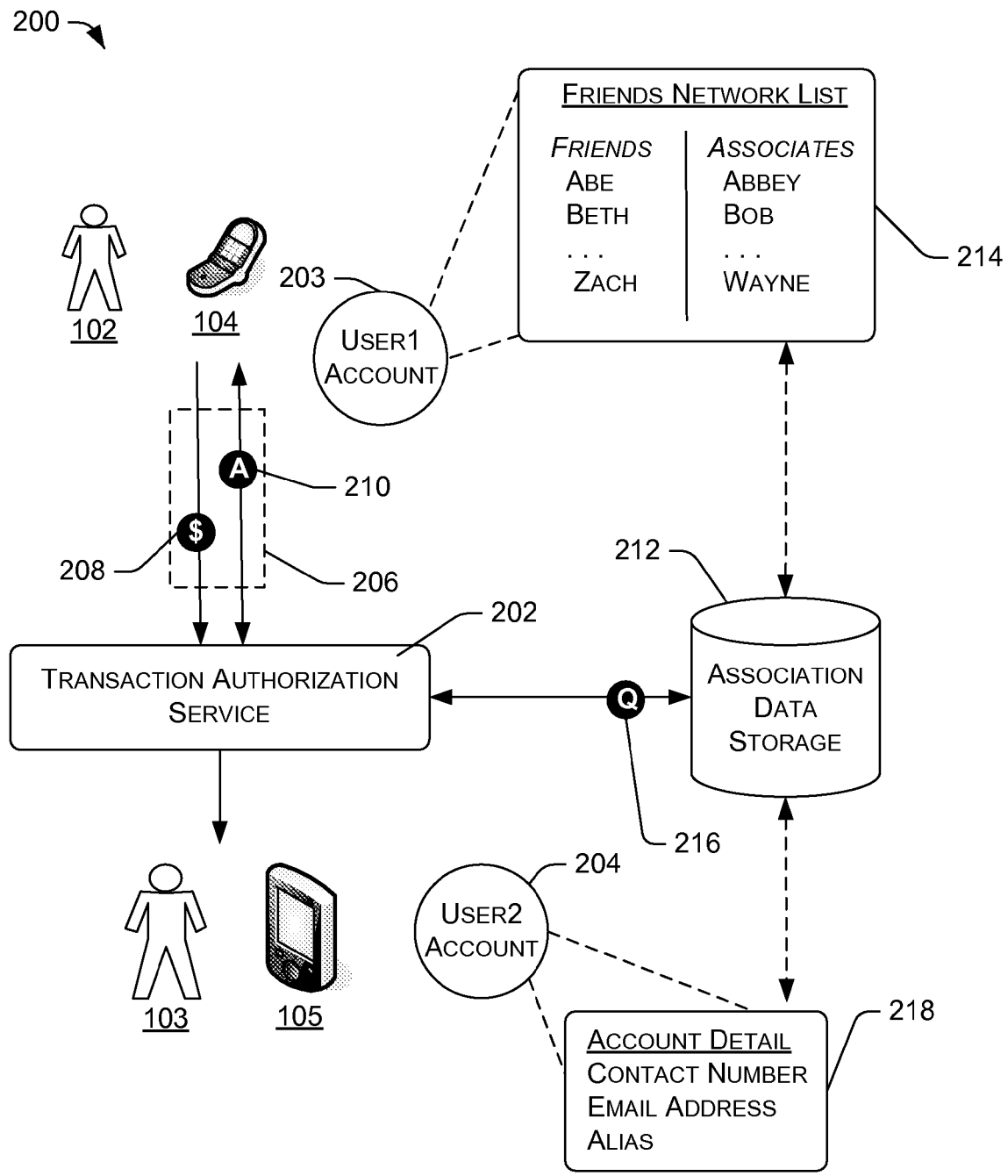
FIG. 2 illustrates an embodiment of a mobile payment network including a transaction authorization service to facilitate transactions between user accounts.

FIG. 2 illustrates an embodiment of a mobile payment network service 200 including a transaction authorization service 202 to facilitate transactions between two user accounts 203 and 204. The user accounts 203 and 204 may be in communication with the transaction authorization service 202 via one or more communication channels 206. In this example, the user accounts are associated respectively with users 102 and 103, also referred to herein as User1 and User2.

The user accounts are also associated with respective users' mobile devices 104 and 105 by way of uniquely identifying information supplied from the mobile devices. For example, the user of a mobile device might be asked to submit a user name and password in order to associate a mobile device with a particular account. Different means might alternatively be used to verify the identity of any particular mobile device, including cryptographic techniques and the transmission of device serial numbers or other identifying information associated with each device.

The mobile payment network service 200 enables a user or account holder 102 associated with the user account 203 to make a payment request 208 from the user's mobile device 104, to transmit a payment from the user account 203 to the account 204 of another user or account holder, in this example user 103.

In some cases, the payment request 208 is transmitted in the form of a web-interface communication, an email, a telephone service, an SMS text message, or via other communications to the transaction authorization service 202. For example, SMS text command formats might be established for different types of requests, such as "Pay 50 John123 dinner" where "50" indicates $50, "John123" is the account 204 of the other account holder, and "dinner" is an optional comment. The payment request 208 might also include a multimedia message such as text and voice media communications. Other permissions or details may be necessary before the funds from the user account 203 are allowed to be transmitted to the other user's account 204. For example, a payment request may be referenced against a spending limit for the requesting account holder, and/or might require some sort of interactive authorization by the user 102—especially when using an unsecure communications media such as SMS.

An interactive authorization process might include transmitting an authorization request 210 from the transaction authorization service 202 to the user 102 via the communication channels 206 and the user's mobile device 104. The authorization request 210 may use a different communications media, other than the media of the original request, such as a voice automated message, an email, or some other form of communication. According to one embodiment, upon the transaction authorization service 202 receiving a payment request, an authorization call may be placed to the sender's cellular phone to confirm the transaction.

In addition to authorizing a request, the user may be prompted or required to enter other information to complete the authorization. For example, the user may be asked to enter a personal identification number (PIN) or password through the user interface of the mobile device. According to one embodiment, for example, the user could input the PIN using the tones associated with the touchpad of a telephone device. In other embodiments, the user may speak PIN and/or other authorization information to an agent who then authorizes (or denies) the transaction.

In the described embodiment, the transaction authorization service 202 also requests location information from both of the mobile devices involved in a requested transaction. From this information, transaction authorization service 202 determines the physical or geographical proximity of the two mobile devices relative to each other. Different authorization steps can be taken depending on the proximity of the two mobile devices. For example, a requested transaction might be allowed only if the location information indicates that the two mobile devices are near each other. Alternatively, the transaction might not be allowed unless the mobile devices report locations that are not near each other. For example, if a sender and receiver are physically separated from one another by some distance, this may be an indication that the sender is not under physical duress to provide the payment to the receiver. Furthermore, rather than denying a requested transaction based on non-proximity (or proximity), transaction authorization service 202 might instead demand alternate authorization procedures, such as the authorization process described above. Information indicating proximity of the two devices, on the other hand, might eliminate the need for the alternate authorization procedures.

Further authorization procedures might include limiting transactions to those between users who have previously identified each other as "friends" or potential transaction partners. In accordance with this embodiment, the transaction authorization service 202 may be in communication with association data 212. The association data 212 may include a friends network list 214 of contacts or "friends" associated with the user, and thus the user account 203. The transaction authorization service 202 may query 216 the association data 212 upon receiving the payment request 208 to determine if the requested payee is included in the association data. For example, the query 216 may compare information from a user account detail 218 of the payee, such as a contact number, email address, alias, or other information to information included in the association data 212. If the query 216 results in a match of the user account 204 to the friends network list 214, the transaction authorization service 202 may modify, or even forego, other authorization procedures. Alternatively, other authorization procedures might be eliminated only if the two users involved in the transaction are also physically near each other, as reported by their mobile devices.

Note that the various described authorization procedures may be used alone or in combination, and some of the procedures may depend on the result of other procedures. For example, if the two mobile devices report location information placing them near each other, further authorization procedures may be omitted. If location information is not available from one or more of the devices, however, one or more other authorization procedures might be initiated.

Figure 3:
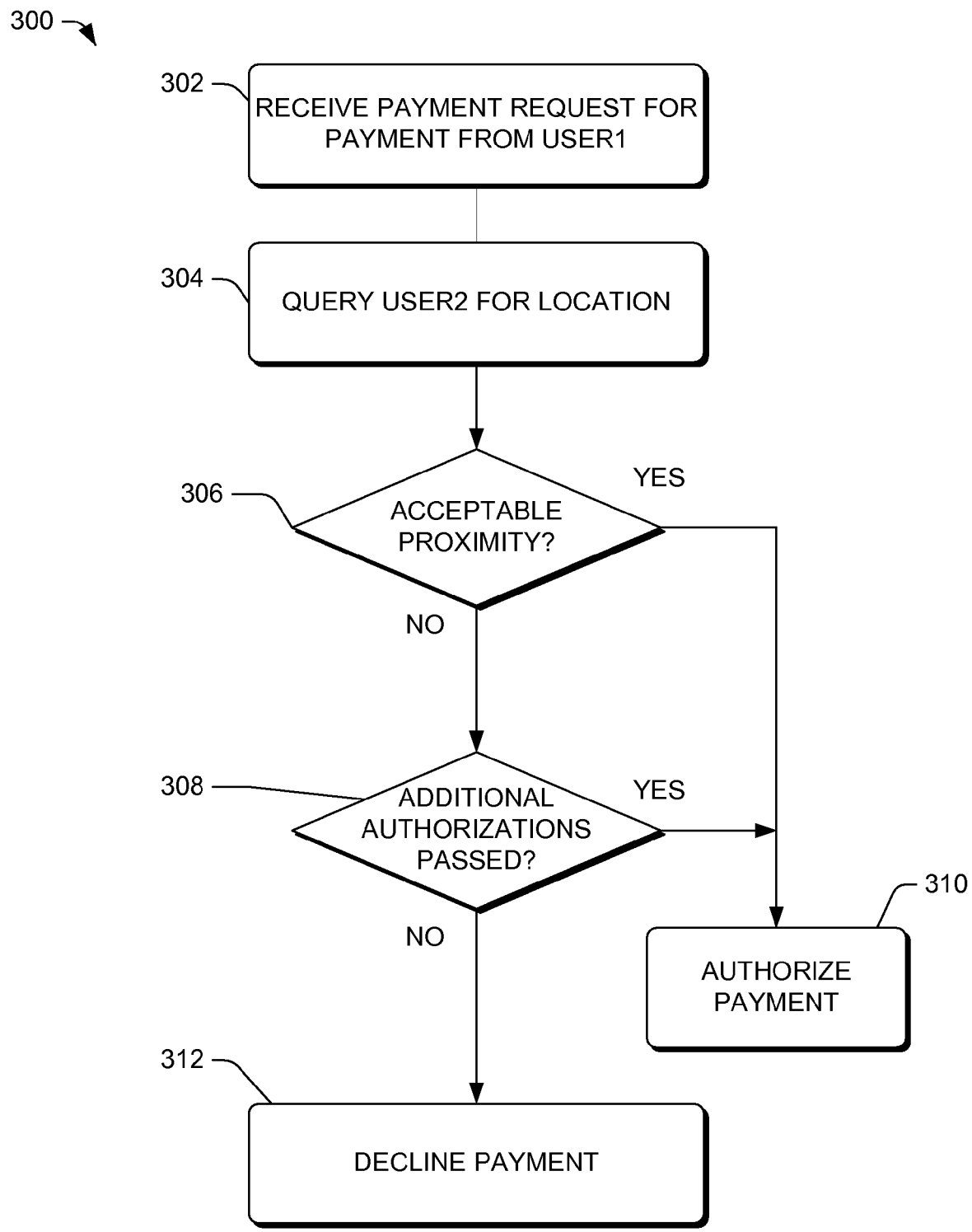
FIG. 3 is a flowchart of an illustrative process of authorizing a transaction between users.

FIG. 3 shows an illustrative process 300 of authorizing a transaction from the user 102. The process 300 is illustrated as a collection of blocks in a logical flow graph, which represent a sequence of operations that can be implemented in hardware, software, or a combination thereof. In the context of software, the blocks represent computer-executable instructions that, when executed by one or more processors, perform the described operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process.

As shown in FIG. 3, block 302, a payment transaction is initiated by receiving a request 208 from a first personal mobile device 104, which is in turn associated with a first user or account holder 102. The request in this example is for a transfer of funds from the first account holder 102 to a second user or account holder 103 who is associated with a second personal mobile device 105. The payment request is transmitted in response to interaction by user 102 with a user interface of mobile device 104 or with an Internet browser or other application displayed on mobile device 104. In either case, the requested payment is received by the transaction authorization service 202 at block 302.

The payment request 208 may include a payment amount (e.g., a currency amount, credit, points, etc.) and a specification of a user account to receive payment. For example, the payment request may include a request to pay Amy123 (user account) a payment of ten dollars (payment amount). The payment request may also include first location coordinates or other location information such as described above, comprising GPS or other geographical information such as area code, zip code, street address, city name, etc. Alternatively or additionally, the payment request may include other data from which location can be reliably deduced (such as access point or cell tower information) or various other types of absolute or relative location data. The first location information thus contains an explicit or implied indication of the location of the first mobile device 104.

In order to send the location information, the mobile device may include software that allows the mobile device to send the location information via an SMS text message, an http request, or otherwise. This software may allow the device to send both the transaction details as well as the location information which may be determined in one or more of the ways discussed immediately above. Furthermore, in some instances the software may encrypt the message in order to ensure privacy regarding the transaction details and/or the location information. Encrypting the location may also ensure that a user of the mobile device (or a user of the receiving mobile device) does not override the location information reported by the device itself.

At 304, the transaction authorization service 202 sends a query to the mobile device 105 of the requested payee, in this case user 103, using any of the communication techniques already mentioned. In response, the transaction authorization service 202 receives second location coordinates or information from the second mobile device 105. Again, this information contains an explicit or implied indication of the location of the second mobile device 105. The response by mobile device 105 might or might not require an action by user 103.

At block 306, the transaction authorization service 202 determines proximity of the first and second mobile devices to each other based on the received first and second location information received from the two mobile devices. That is, the transaction authorization service 202 determines whether the two mobile devices 102 and 103 involved in the requested transaction are near each other. It does this by comparing the received location information, depending on the type of location information that has been chosen in the particular system. Geographical coordinates, for example, can be compared to determine actual distances between the two devices. In other situations, it might be necessary to refer to other data in order to derive location information from the data supplied by the mobile devices. Furthermore, in some cases it may be possible to determine relative proximity of the two mobile devices without necessarily determining their absolute locations. For example, it may be sufficient to know that the two devices are using the same wifi hotspot or cellular tower, even if the exact location of that hotspot or tower is not known.

In some implementations, transaction authorization service 202 might specify a predetermined proximity or distance that is considered sufficient to conclude that the mobile devices are near each other. For example, the predetermined proximity might be specified as 1000 feet, to allow for inaccuracies in position determining techniques.

Block 308 indicates conditioning or qualifying the requested transaction or further authorization steps on the result of the previous proximity determining step. For example, the determined nearness of the mobile devices to each other might cause service 202 to decline the requested transaction, or to initiate additional security procedures (such as the other security procedures described herein) that would not otherwise have been necessary.

However, if service 202 determines that mobile devices 104 and 105 are near each other, the transaction might be allowed to proceed as indicated by blocks 306 and 310. Note that in actual practice, further types of authorization procedures may be used in combination with the proximity determination of block 306. In other words, while physical proximity may allow some authorization steps to be omitted, other such steps may be used even when users are determined to be near each other. For example, transactions might be allowed only between users who have previously identified each other as "friends," despite their physical proximity.

If service 202 cannot verify proximity, the transaction might simply be denied. More generally, however, inability to confirm physical proximity of the two users may be a condition that dictates which further authorizations will be performed. Thus, rather than simply declining the requested transaction, additional authorizations 308 might be attempted. If those authorizations are successful, the requested transaction might still be allowed in block 310. Otherwise, or if the system is configured to deny any transaction that fails the proximity test, the transaction is refused in block 312.

While block 306 may merely look to a current proximity of devices to one another, other implementations may additionally or alternatively analyze other data when making authorization process decisions. For example, some implementations may look at historical data to determine if two users are normally near another. If so, then a requested transaction between mobile devices of these users may be authorized more easily than between mobile devices of users that are seldom near each other. Of course, in certain implementations the converse may instead be true.

Furthermore, some implementations may analyze information regarding days and times that users are normally around one another (as well as days and times in which the users are not normally around each other). For instance, envision that a first user works at a same physical office as does a second user. Envision also that while these two users are often near one another during the work week while in the office, these users are rarely geographically close to one another during the weekend. As such, for a requested work-week transaction between these two mobile devices, fewer authorization procedures may be employed when compared with a requested transaction is made on the weekend. Again, in other implementations that converse may instead be true.

Finally, it is noted that while the above discussion focuses on physical proximity between devices at a particular point in time, some implementations may determine whether devices are within an acceptable proximity to one another over a defined time range. In these embodiments, a transaction may be initiated at a time when two mobile devices are not within an acceptable physical proximity of one another. As such, the transaction might not be allowed to progress (or additional authorization procedures may be employed). However, if these two devices move into the acceptable proximity of one another at some future time within the defined time range, then the transaction may begin at that point (e.g., the transaction may be automatically authorized). The defined time range may comprise minutes, hours, days, weeks, or months. Furthermore, in some implementations the defined time range may not include an ending point.

Illustrative Example

Having described an illustrative system architecture and illustrative operations above, this section describes one illustrative but non-limiting example of how the described techniques may be practiced.

The example is set in the context of two friends, Diwakar and C.J., going out to a restaurant together for dinner. Here, Diwakar pays the $40 dinner bill. C.J. then sends (from his mobile device) the following text payment to Diwakar's mobile device: 'pay Diwakar 20 dinner'. C.J.'s mobile device also sends location information with the payment request, as described above. A transaction authorization service, such as the host 108 from FIG. 1, then sends a request for location information to Diwakar's mobile device. Diwakar's device, if set to automatically transmit location information, reports this information in response to the request. The transaction authorization service then determines the proximity based on the location information of Diwakar's and C.J.'s mobile devices. The transaction authoring service then looks at proximity rules associated with C.J.'s account, and finds that C.J. has defined that any transactions that are less than $100 are automatically approved when C.J. is within one mile of the recipient. Accordingly, the transaction service, determining that C.J. and Diwakar are in the same restaurant, and thus within one mile of each other, automatically approves the transfer of $20 to Diwakar without any further authorization steps.

Continuing the example, envision that Diwakar and C.J. plan to meet up with their other friends Kiran and Chris at a movie theater later that night. At the theater, Kiran purchases movie tickets for all four of the friends while Diwakar and C.J. finish their meal at the restaurant. Kiran makes a payment request to C.J. and Diwakar by issuing the command 'req 10 Diwakar C.J.' on Kiran's mobile device, which sends a payment request to Diwakar and C.J. for $10 to cover the movie tickets. Diwakar's account has Kiran listed in his "friends" list, but C.J.'s account does not. Diwakar also has a proximity rule that defines that if a payment request comes from someone not in his friends list, they are automatically authorized only if the recipient is within one mile of Diwakar's phone. Diwakar also has an account rule that automatically approves payment requests if the request comes from someone on his list of friends. Therefore, even though the movie theater is more than 1 mile away, Diwakar's account automatically pays Kiran the $10 since he is a known friend.

C.J., meanwhile, has the same proximity rule as does Diwakar. That is, C.J.'s account only automatically approves requests from unlisted friends if C.J. is within one mile of the requestor. However, since Kiran is not in C.J.'s friends list and since C.J. is more than 1 mile away, this payment request is not automatically approved. Rather, C.J. receives a phone call from the transaction authorization service that requests that C.J. approve the transaction by entering a PIN number into the keypad of the mobile device. C.J. enters the correct PIN and Kiran is paid the $10 from C.J.'s account.

Additional Embodiments

In addition to employing location-aware technology for the purpose of authorizing payment between mobile devices, some embodiments may additionally or alternatively employ this technology for sending and receiving communications between the mobile devices themselves. For instance, some embodiments may allow a user associated with a first mobile device to send a request for payment to other mobile devices within a predefined proximity. Furthermore, many other types of communications may be sent and received between these devices, with the recipients of the message being based at least in part on a proximity to the sending mobile device.

Figure 4:
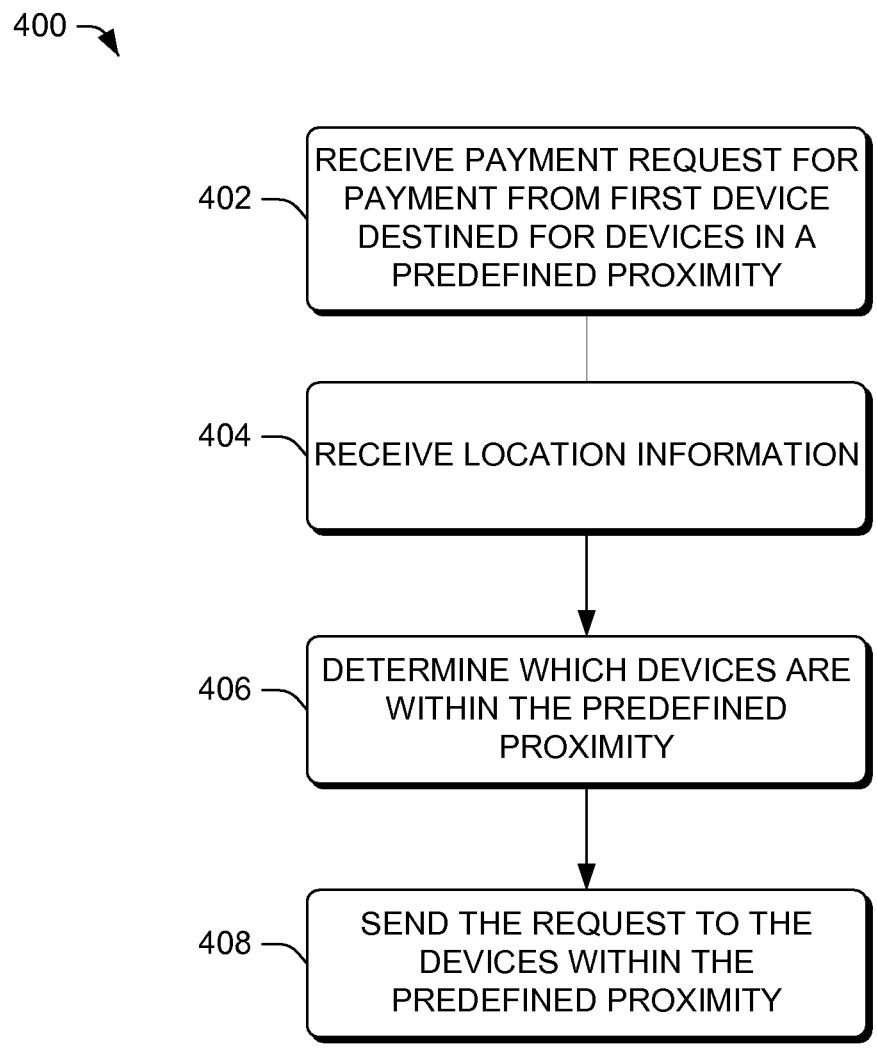
FIG. 4 is another flowchart of an illustrative process of sending payment requests between users.

FIG. 4 illustrates a process 400 for receiving a communication, such as a payment request, and sending the communication to mobile devices within a predefined proximity of the device that sent the communication. The process 400 includes an operation 402, which represents receiving a payment request from a first mobile device destined for one or more other mobile devices that are within a predefined proximity of the first mobile device. A transaction authorization service, such as host 108, may receive this payment request, which may comprise a short message service (SMS) message, an http request, or any other form of communication.

In some instances, the request specifies as intended recipients of the request a subset of the mobile devices within the predefined proximity. For instance, the first mobile device may send a payment request to those mobile devices within a certain proximity whose associated users appear on a contacts list of the user of the first device. For instance, these users may appear on a friends network list of the user of the first device, as described above with reference to FIG. 2. Furthermore, the subset may comprise a specified group in some instances, such as those mobile devices associated with users who are members of a club, school, or who share some other affiliation. In still other instances, the request may be intended for each mobile device within the predefined proximity (or at least each device that communicates with the transaction authorization service or host that forwards on the payment request).

Additionally, the first mobile device may specify the predefined proximity, either in the payment request itself or otherwise. Thus, the user of the first mobile device may send a request for payment to the users listed "friends" that are within one mile of the first mobile device. While this example specifies one mile as the predefined proximity, the user of the first mobile device may alternatively specify any other lesser or greater distance. Furthermore, while the first mobile device may specify the predefined proximity, this proximity may also comprise a default proximity in some instances.

Operation 404 represents receiving location information from the first mobile device and/or from some or all of the intended recipients of the payment request. In the example where the user sends a payment request to the user's listed friends that are within one mile of the first mobile device, the transaction authorization service may attempt to obtain location information for the mobile devices associated with the listed friends. Additionally or alternatively, the service may receive location information from the first mobile device, either as a part of the received payment request or otherwise. Each of the received location information may be obtained in one or more of the ways discussed above (e.g., receiving global positioning data, receiving cellular tower information, etc.).

Based at least in part on the received location information, operation 406 determines which of the devices are within the predefined proximity. Based at least in part on this determination, operation 408 then sends the request to the mobile devices that are within this proximity of the first mobile device. Each of these mobile devices may then receive the payment request originally sent from the first mobile device. Respective users may then either approve or deny the payment request. Alternatively, some or all of the mobile devices may automatically authorize or deny the payment request.

Illustrative Example

To illustrate these techniques, this section describes one illustrative but non-limiting example of how the described techniques may be practiced. The example here is set in the context of four friends (again, Diwakar, C.J., Kiran, and Chris) going out to dinner with one another at a restaurant. Here, Diwakar pays the entire $80 dinner bill. However, Diwakar desires for each of the other three friends to contribute $20 to the bill. Furthermore, each of C.J., Kiran, and Chris appear as friends in a friends network list associated with Diwakar's account. Therefore, Diwakar sends a request for payment to his "friends" that are within a predefined proximity (e.g., one block, 200 feet, one mile, in the same city, etc.). In the current example, Diwakar specifies as recipients of the payment request his "friends" that are within 200 feet of Diwakar's mobile device.

A service, such as host 108, receives this payment request as well as location information of Diwakar's mobile device. The service then looks up the list of friends on Diwakar's friends network list and attempts to determine locations of these corresponding devices. Here, the service may determine that of the listed friends, only the mobile devices associated with C.J., Kiran, and Chris are within the specified proximity of 200 feet in relation to Diwakar's mobile device. As such, C.J., Kiran, and Chris each receive the payment request for $20. Diwakar's other listed friends, meanwhile, are not within the predefined proximity of Diwakar's mobile device and, hence, do not receive the payment request. In the current example, each of C.J., Kiran, and Chris approve the requested payment and a total of $60 is transferred to Diwakar's account.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. One or more non-transitory computer-readable media storing computer-executable instructions that, when executed on one or more processors, perform acts comprising:
   receiving, from a first mobile device associated with a first account, a request for payment from one or more other accounts associated with respective other mobile devices that are within a specified proximity of the first mobile device;
   receiving location information that indicates a location of the first mobile device;
   determining which of the other mobile devices are within the specified proximity of the first mobile device based at least in part on the received location information;
   identifying historical data that indicates an extent to which the first mobile device and the other mobile devices have been in proximity to one another; and
   forwarding the request for payment to the mobile devices that are determined to be within the specified proximity of the first mobile device and based at least in part on the historical data.

2. One or more non-transitory computer-readable media as recited in claim 1, wherein each of the one or more other accounts associated with the respective mobile devices appear on a contacts list created by a user associated with the first account.

3. One or more non-transitory computer-readable media as recited in claim 1, wherein the receiving of the location information comprises receiving global positioning data that indicates the location of the first mobile device.

4. One or more non-transitory computer-readable media as recited in claim 1, wherein the receiving of the location information comprises receiving cellular tower information that indicates the location of the first mobile device.

5. One or more non-transitory computer-readable media as recited in claim 1, wherein the receiving of the location information comprises receiving wireless access point information that indicates the location of the first mobile device.

6. One or more non-transitory computer-readable media as recited in claim 1, wherein the received and forwarded request for payment comprises short message service (SMS) messages.

7. One or more computing devices comprising:
   one or more processors; and
   one or more non-transitory computer-readable media storing computer-executable instructions that, when executed on the one or more processors, perform acts comprising:
      receiving, from a first mobile device associated with a first account, a request for payment from one or more other accounts associated with respective other mobile devices that are within a specified proximity of the first mobile device;
      receiving location information that indicates a location of the first mobile device;
      determining which of the other mobile devices are within the specified proximity of the first mobile device based at least in part on the received location information;
      identifying historical data that indicates an extent to which the first mobile device and the other mobile devices have been in proximity to one another; and
      forwarding the request for payment to the mobile devices that are determined to be within the specified proximity of the first mobile device and based at least in part on the historical data.

8. A method comprising:
   receiving, from a first mobile device associated with a first user account, a request for payment from a second user account associated with a second mobile device that is within a predefined proximity of the first mobile device;
   determining that the second mobile device is within the predefined proximity of the first mobile device;
   identifying historical data that indicates whether the first mobile device and the second mobile device have been within the predefined proximity from one another; and
   sending the request for payment to the second mobile device that is within the predefined proximity of the first mobile device based at least in part on the historical data.

9. A method as recited in claim 8, wherein the second user account includes contacts of the first user account.

10. A method as recited in claim 8, further comprising receiving location information that indicates a location of the first mobile device, and wherein the determining that the second mobile device is within the predefined proximity is based at least in part on the received location information.

11. A method as recited in claim 8, further comprising receiving location information for the second mobile device, the received location information indicating a location of the second mobile device, and wherein the determining that the second mobile device is within the predefined proximity is based at least in part on the received location information.

12. A method as recited in claim 8, wherein the first mobile device specifies the predefined proximity.

13. A method as recited in claim 8, wherein the first mobile device specifies the predefined proximity in the request for payment.

14. A method comprising:
   receiving, from a first mobile device associated with a first account, a request for payment from at least a subset of accounts associated with respective mobile devices that are within a predefined proximity of the first mobile device;
   receiving location information of the first mobile device;
   determining which of the subset of the respective mobile devices are within the predefined proximity of the first mobile device based at least in part on the received location information;

identifying historical data that indicates particular times that the first mobile device and the respective mobile devices have been within the predefined proximity of one another; and forwarding the request for payment to the mobile devices that are within the subset, that are determined to be within the predefined proximity of the first mobile device, and implementing an amount of authorization procedures prior to forwarding the request for payment based at least in part on the historical data.

15. A method as recited in claim 14, wherein a first user is associated with the first account, and wherein the subset comprises accounts associated with respective users that have been listed as contacts of the first user.

16. A method as recited in claim 14, wherein a first user is associated with the first account, and wherein the subset comprises accounts associated with respective users that appear as friends on a friends network list of the first user.

17. A method as recited in claim 14, wherein the subset comprises each account associated with a respective mobile device that is within the predefined proximity of the first mobile device.

18. A method as recited in claim 14, wherein the request from the first mobile device specifies the predefined proximity to the first mobile device.

19. A method as recited in claim 14, wherein the predefined proximity is a default proximity to the first mobile device.

20. A method comprising receiving a request for payment from a first mobile device, the request for payment specifying as recipients of the request for payment mobile devices that are: (i) members of a particular group, and (ii) within a specified proximity of a location of the first mobile device;

receiving location information from the first mobile device, the location information indicating the location of the first mobile device;

determining which of the mobile device members are within the specified proximity of the location of the first mobile device based at least in part on the location information;

identifying historical data that indicates an extent to which the first mobile device and the mobile device members have been in proximity to one another; and sending, based at least partly on the historical data, the request for payment to the mobile device members that are determined to be within the specified proximity of the location of the first mobile device.

21. A method as recited in claim 20, wherein the historical data indicates the extent to which the first mobile device and each of the mobile device members have been in proximity to one another.

22. A method as recited in claim 20, wherein the request for payment is from accounts associated with respective ones of the mobile device members that are within the specified proximity of the location of the first mobile device.

23. A method as recited in claim 20, wherein the particular group comprises a group of contacts that have previously been associated with an account of the first mobile device.

24. A method as recited in claim 20, wherein the request for payment comprises a short message service (SMS) message.

25. A method as recited in claim 20, wherein the location information comprises global positioning data, cellular tower information, or wireless access point information.

26. One or more non-transitory computer-readable media storing computer-executable instructions that, when executed on one or more processors, perform acts comprising:

receiving, from a first user via a mobile device associated with the first user, a request for payment from other users having associated mobile devices that are within a specified proximity from the mobile device;

receiving location information that indicates a current location of the mobile device and current locations of the associated mobile devices;

determining that a current location of at least one associated mobile device of the associated mobile devices is within the specified proximity from the current location of the mobile device;

identifying historical data that indicates an extent to which the mobile device and the at least one associated mobile device have been in proximity to one another; and initiating payment from the at least one associated mobile device based at least partly on the historical data and in response to determining that the current location of the at least one associated mobile device is within the specified proximity from the current location of the mobile device.

27. One or more non-transitory computer-readable media as recited in claim 26, wherein identifying the other users comprises identifying only users who have been previously specified as acquaintances of the first user.

28. One or more non-transitory computer-readable media as recited in claim 26, wherein the request for payment comprises a reimbursement request.

* * * * *